United States Patent
Wakabayashi et al.

(10) Patent No.: US 8,646,788 B2
(45) Date of Patent: Feb. 11, 2014

(54) STEERING DAMPER DEVICE FOR SADDLE-RIDING TYPE VEHICLE

(75) Inventors: Takeshi Wakabayashi, Wako (JP); Tsuyoshi Tsuda, Wako (JP); Bunzo Seki, Wako (JP); Keita Yagi, Wako (JP); Hidefumi Ishii, Wako (JP); Kazushiro Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 978 days.

(21) Appl. No.: 12/716,414

(22) Filed: Mar. 3, 2010

(65) Prior Publication Data
US 2010/0243391 A1 Sep. 30, 2010

(30) Foreign Application Priority Data

Mar. 30, 2009 (JP) ................................. 2009-083522

(51) Int. Cl.
*B62D 7/22* (2006.01)
(52) U.S. Cl.
USPC ............................................. 280/89; 280/90
(58) Field of Classification Search
USPC ................ 280/272, 89.12, 89.13, 290, 89, 90
See application file for complete search history.

(56) References Cited

U.S. PATENT DOCUMENTS

| 927,735 | A | * | 7/1909 | Lemp | 280/90 |
| 4,773,514 | A | * | 9/1988 | Gustafsson | 188/306 |
| 5,076,383 | A | * | 12/1991 | Inoue et al. | 180/417 |
| 6,120,046 | A | * | 9/2000 | Daly | 280/90 |
| 7,377,533 | B2 | * | 5/2008 | Takeuchi et al. | 280/272 |
| 7,722,061 | B2 | * | 5/2010 | Kohls et al. | 280/90 |
| 7,871,091 | B2 | * | 1/2011 | Wakabayashi et al. | 280/89 |
| 7,891,681 | B2 | * | 2/2011 | Gustafsson et al. | 280/89 |
| 2006/0119063 | A1 | * | 6/2006 | Bodin | 280/89 |
| 2008/0272568 | A1 | | 11/2008 | Matschl et al. | |

FOREIGN PATENT DOCUMENTS

| JP | 09-132189 | 5/1997 |
| JP | 2000-238684 A | 9/2000 |
| JP | 2007-112154 A | 5/2007 |
| JP | 2007-246075 A | 9/2007 |
| JP | 2008-222026 A | 9/2008 |

* cited by examiner

*Primary Examiner* — Tony Winner
(74) *Attorney, Agent, or Firm* — Squire Sanders (US) LLP

(57) ABSTRACT

A saddle riding type vehicle includes a vehicle body frame 4 constituting the vehicle, a front wheel disposed steerably on the vehicle body frame 4, a steering shaft 27 transmitting a steering input from a rider to the front wheel, and a steering damper 36 giving a steering mechanism 57 an attenuation force relative to rotation of the steering shaft 27. The steering damper 36 includes a damper case 72, a vane rotatable in the damper case 72, and an arm 73 directly connected to the vane and extending to an outside of the damper case 72. The damper case 72 is disposed between an upper steering shaft 27*a* and a lower steering shaft 27*b* to form part of the steering shaft 27, and the arm 73 is directly connected to the vehicle body frame 4.

12 Claims, 6 Drawing Sheets

(A)

(B)

STEERING DAMPER DEVICE FOR SADDLE-RIDING TYPE VEHICLE

BACKGROUND

1. Field

Embodiments of the present invention relate to a steering damper device for a saddle riding type vehicle that attenuates an oscillation of a handlebar of the vehicle while running.

2. Description of the Related Art

Saddle riding type vehicles generally include a steering damper device that generates a damping force to attenuate the oscillation of the handlebar occurring from disturbances, such as road surface conditions, while the vehicle is running. A known vehicle of this type has a steering damper device disposed at an upper end portion of a steering shaft, specifically, near the handlebar (see, for example, Japanese Patent Laid Open No. Hei 09 132189).

A steering damper may be disposed at the upper end portion of the steering shaft, specifically, near the handlebar in an all terrain vehicle (ATV). Meters, indicators, and other parts to be visually recognized by the rider are typically placed at this position. This requires that both these parts and the steering damper be disposed at the same location, which may restrict the size or shape of the parts in question and the steering damper.

SUMMARY

Embodiments of the present invention provide a steering damper device for a saddle riding type vehicle that improves the degree of freedom in disposing the steering damper by making an effective use of a space inside a vehicle body frame.

To solve the foregoing problem, examples of the present invention provide a steering damper device for a saddle riding type vehicle. The saddle riding type vehicle may include a vehicle body frame constituting the vehicle, a front wheel disposed steerably on the vehicle body frame, a steering shaft transmitting a steering input from a rider to the front wheel, and a steering damper giving a front wheel steering system an attenuation force relative to rotation of the steering shaft. The steering damper may include a damper case, a vane rotatable in the damper case, and an arm directly connected to the vane and extending to an outside of the damper case. The damper case is disposed midway in the steering shaft to form part thereof and the arm is directly connected to the vehicle body frame.

In accordance with certain embodiments, the damper case is disposed midway in the steering shaft to form part thereof. As compared with an arrangement in which the steering damper is disposed around the steering shaft, the damper case requires a smaller mounting space. Consequently, the space in the vehicle body frame can be effectively used, so that the degree of freedom in disposing the steering damper can be improved.

In some embodiments, the vehicle may further include rotation support members disposed at an upper portion and a lower portion of the vehicle body frame, the rotation support members supporting rotation of the steering shaft. Further, the damper case may be disposed between the upper and lower rotation support members.

In accordance with some embodiments, compression stress, tensile stress, and bending stress applied to the damper case via the steering shaft can be reduced. The damper case can therefore be formed to have a reduced load resistance, so that further reduction in weight and size of the damper case can be achieved.

According to some embodiments, the arm is connected to the vehicle body frame via a buffer mechanism. In accordance with this embodiment, displacement that would occur in the steering shaft during running, for example, can be absorbed by the buffer mechanism. In addition, vibration transmitted from the vehicle body frame to the steering damper can also be reduced. Smooth operation of the vane inside the damper case can therefore be maintained. Accordingly, performance of the steering damper can be stabilized.

According to some embodiments, the steering damper is disposed within a space surrounded by the vehicle body frame and, in a side view, overlaps at least part of the vehicle body frame.

In accordance with one embodiment, the steering damper is disposed within a space surrounded by pipes and frames constituting the vehicle body frame, which provides a rotatable range for the damper case of the steering damper. Additionally, the steering damper may be disposed so as to overlap in a side view at least part of the vehicle body frame, so that sides of the damper case of the steering damper can be protected. Further, by disposing, for example, a vehicle body cover outside the vehicle body frame, the steering shaft and the steering damper can be protected from, for example, flying gravel.

In certain embodiments, the vehicle further includes an upper cross pipe connecting between a pair of left and right upper frames and a cross member connecting between a pair of left and right front pipes. Further, the arm of the steering damper is connected to either the upper cross pipe or the cross member. In accordance with these embodiments, the arm of the steering damper is connected to either the upper cross pipe or the cross member which is adapted to offer reliable rigidity strength. The arm can therefore stably receive a reaction force of the attenuation force generated by the steering damper, so that attenuation performance of the steering damper can further be stabilized.

Additionally, in some embodiments, the arm extends rearwardly of a vehicle body from the damper case. In accordance with this embodiment, the damper case is disposed forwardly of the arm, which provides a reliable protection for the arm against a forward impact applied thereto.

Additionally, according to certain embodiments of the present invention, displacement that would occur in the steering shaft during, for example, running can be absorbed by the buffer mechanism. In addition, vibration transmitted from the vehicle body frame to the steering damper can also be reduced. Smooth operation of the vane inside the damper case can therefore be maintained. Accordingly, performance of the steering damper can be stabilized.

Additionally, according to some embodiments of the present invention, the steering damper is disposed within a space surrounded by the vehicle body frame, which provides a rotatable range for the damper case of the steering damper. Additionally, the steering damper is disposed so as to overlap in a side view at least part of the vehicle body frame, so that sides of the damper case of the steering damper can be protected.

Additionally, according to certain embodiments, the arm of the steering damper is connected to either the upper cross pipe or the cross member which is adapted to offer reliable rigidity strength. The arm can therefore stably receive a reaction force of the attenuation force generated by the steering damper, so that attenuation performance of the steering damper can further be stabilized.

Additionally, according to an embodiment of the present invention, the damper case is disposed forwardly of the arm, which provides a reliable protection for the arm against a forward impact applied thereto.

DETAILED DESCRIPTION

Figure 1:
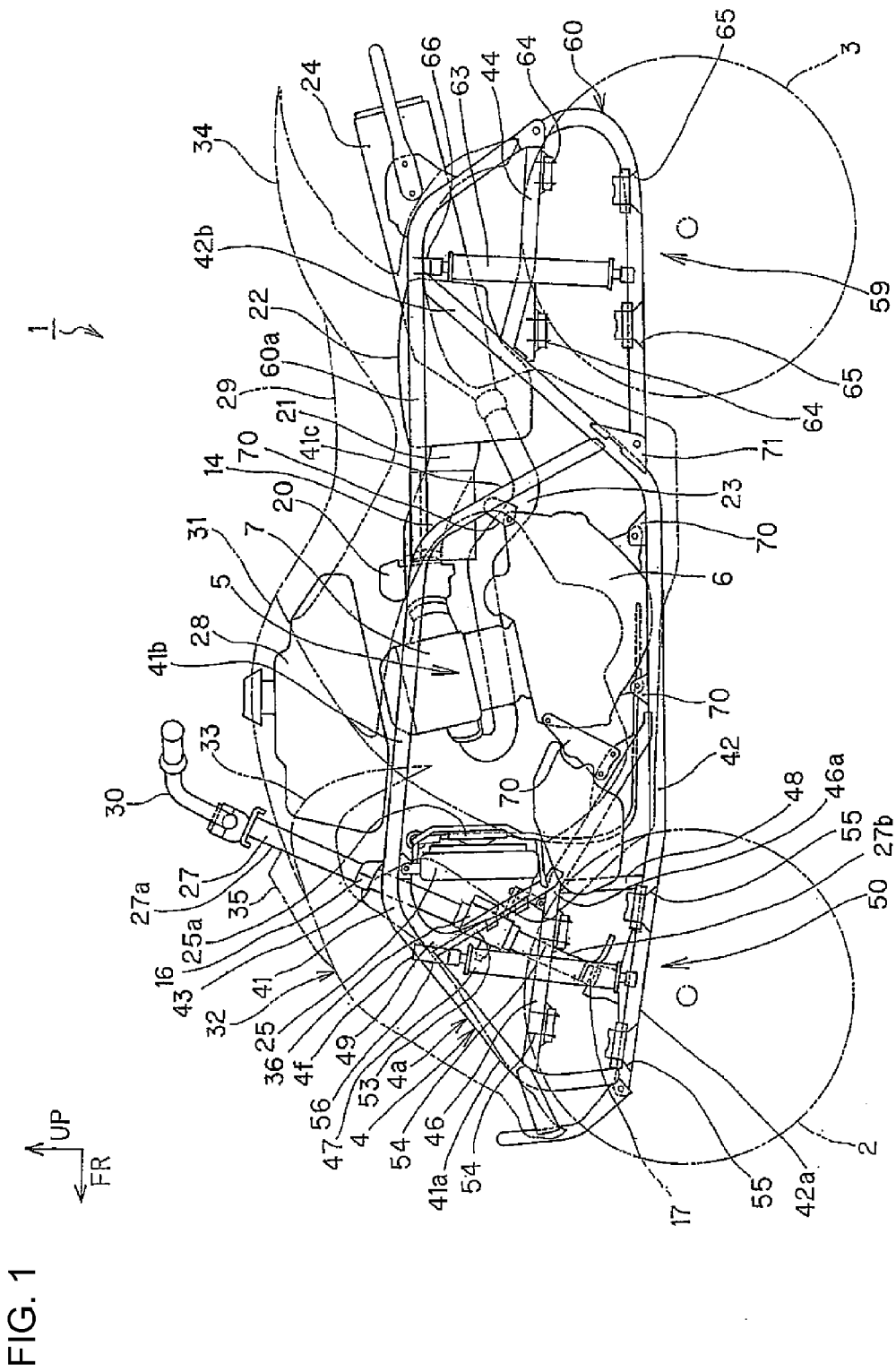
FIG. 1 is a side elevational view showing a saddle riding type vehicle according to an embodiment of the present invention.
Figure 2:
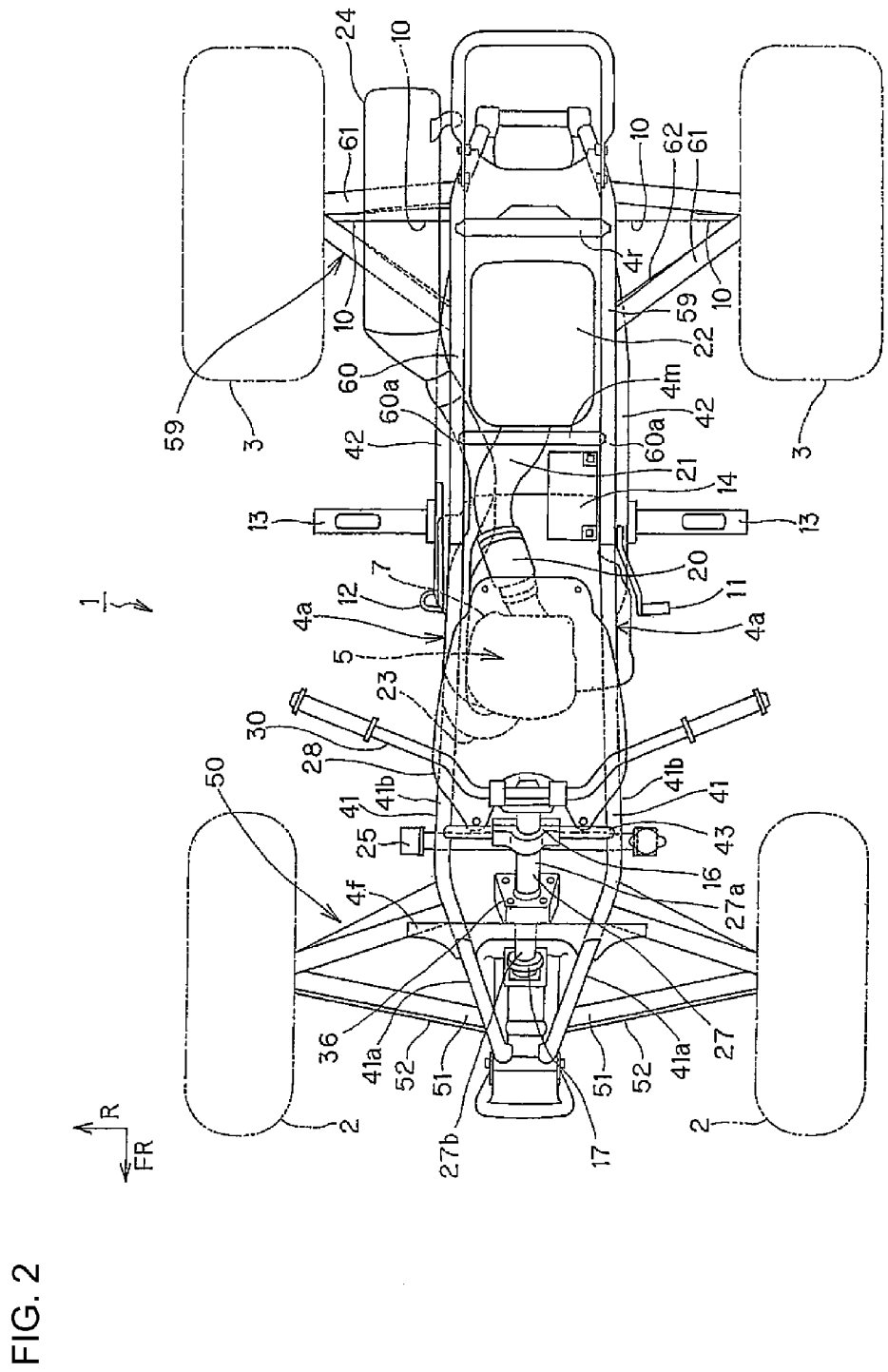
FIG. 2 is a plan view showing the saddle riding type vehicle according to the embodiment of the present invention.

Embodiments of the present invention will be described below with reference to the accompanying drawings. Throughout the descriptions given hereunder, expressions indicating directions including "longitudinal," "lateral," and "vertical" are relative to the directions as viewed by an occupant (rider) on board the vehicle body. FIG. 1 is a side elevational view showing a saddle riding type vehicle according to an embodiment of the present invention. FIG. 2 is a plan view of the saddle riding type vehicle according to an embodiment of the present invention.

In one example, a saddle riding type vehicle 1 is a four wheel vehicle which can be categorized as an ATV (all terrain vehicle). The saddle riding type vehicle 1 includes left and right front wheels 2 and rear wheels 3 having a relatively large diameter mounted at front and rear of a vehicle body. Some ATV's are configured to be compact and lightweight. Having a sufficient minimum ground clearance, the vehicle 1 offers enhanced running performance on rough roads.

Referring to FIG. 1, the saddle riding type vehicle 1 has a vehicle body frame 4. The left and right front wheels 2 are suspended via a front suspension 50 at a front portion of the vehicle body frame 4, and the left and right rear wheels 3 are suspended via a rear suspension 59 at a rear portion of the vehicle body frame 4.

An engine, such as a water cooled engine, 5 is supported via a plurality of engine mounts 70 at a substantially central portion of the vehicle body frame 4. A throttle body 20 and an air cleaner case 22 constitute an intake system of the engine 5. Specifically, the throttle body 20 is connected to a rear portion of a cylinder portion 7 of the engine 5. The air cleaner case 22 is connected to a rear portion of the throttle body 20 via a connecting tube 21. Further, an exhaust pipe 23 is connected forwardly of the cylinder portion 7 of the engine 5. Referring to FIG. 2, the exhaust pipe 23 extends forwardly of the cylinder portion and bends rightwardly of the vehicle body before turning around rearwardly. The exhaust pipe 23 then extends rearwardly along the right side of the cylinder portion 7 and is connected to a muffler 24 disposed at the rear portion of the vehicle body. The exhaust pipe 23 and the muffler 24 constitute an exhaust system of the engine 5. In FIG. 2, reference numeral 11 denotes a shift pedal, reference numeral 12 denotes a brake pedal, reference numerals 13, 13 denote footrest steps, and reference numeral 14 denotes a battery.

Referring to FIG. 1, an engine cooling radiator 25 is disposed forwardly of the engine 5. Connected to the engine 5 via coolant pipes made of rubber, the radiator 25 cools coolant supplied from the engine 5 with an air flow from the front of the vehicle body and returns the coolant back to the engine 5. The radiator includes a blower fan 25a (FIG. 1) disposed on the back surface thereof. The blower fan 25a forces outside air through the radiator 25 to cool the coolant. Additionally, a reservoir tank (not shown) storing the coolant is disposed downwardly of the radiator 25 (on the left side according to one embodiment of the present invention) and connected to the radiator 25 via a coolant pipe made of, for example, rubber.

The engine 5 includes a crankcase 6 that journals, for example, a crankshaft and the cylinder portion 7 connected on top of the crankcase 6. The crankcase 6 serves also as a transmission case accommodating a transmission. The crankcase 6 has an output shaft connected to the transmission disposed therein. Rotation of the output shaft is transmitted to a final gear case (not shown) disposed at the rear portion of the vehicle body frame 4 via a chain transmission mechanism not shown, so that the rear wheels are rotatably driven via a drive shaft 10 (FIG. 2) extending laterally in the final drive case.

Referring to FIG. 1, a steering shaft 27 that steers the front wheels 2, 2, a fuel tank 28, and a straddle type seat 29 are disposed in sequence from the front side at the central portion in the vehicle width direction on the upper portion of the vehicle body frame 4. The steering shaft 27 is rotatably supported by a shaft upper support portion (rotation support member) 16 and a shaft lower support portion (rotation support member) 17 disposed at the upper and lower portions, respectively, of the vehicle body frame 4. A handlebar 30 disposed forwardly and obliquely upwardly of the fuel tank 28 is mounted at an upper end portion of the steering shaft 27. The steering shaft 27 has a lower end portion connected to a steering mechanism, so that the front wheels 2, 2 are steered by the handlebar 30 via the steering mechanism.

The fuel tank 28 is disposed upwardly of the engine 5. Fuel in the fuel tank 28 is supplied via a fuel pump (not shown) to an injector (not shown) disposed in the throttle body 20. The injector then supplies the fuel into the engine 5.

The straddle type seat 29 extends longitudinally along the vehicle body, having a front end thereof fixed to a tank cover 31 that covers upwardly of the fuel tank 28 and fixed to the vehicle body frame 4.

In addition, the vehicle body frame 4 is mounted with a vehicle body cover 32, a front fender 33, and a rear fender 34. Specifically, the vehicle body cover 32 formed from a resin covers the vehicle body. The front fender 33 formed from a resin covers the front wheels 2 by extending from forward to upward and rearward areas of the front wheels 2. The rear fender 34 covers the rear wheels 3 by extending from forward to upward areas of the rear wheels 3. In addition, the vehicle body cover 32 includes a top cover 35 that covers the front portion of the vehicle body and a pair of left and right side covers (not shown) that cover left and right areas of the front portion of the vehicle body.

Referring to FIG. 2, the vehicle body frame 4 includes a pair of left and right main frames 4a, 4a and a pair of left and right sub frames 60, 60. Specifically, the main frames 4a, 4a extend substantially longitudinally along the vehicle body. The sub frames 60, 60 are connected to rear portions of the main frames 4a, 4a. The main frames 4a, 4a are formed by connecting a plurality of types of steel stock (cylindrical pipe frames (round pipe frames)) through, for example, welding. A pair of left and right closed loop structural bodies is formed to include mainly a pair of left and right upper frames 41, 41 and a pair of left and right lower frames 42, 42. The pair of left and right closed loop structural bodies is connected via, for example, a plurality of cross members 4f, 4m, 4r to form a longitudinally extending box structure at the central portion in the vehicle width direction.

Referring to FIGS. 1 and 2, the pair of left and right upper frames 41, 41 includes front portion inclined portions 41a, 41a, intermediate portions 41b, 41b, and rear portion inclined portion 41c, 41c. Specifically, the front portion inclined portions 41a, 41a extend rearwardly, obliquely upwardly from front ends thereof and gradually widening a gap therebetween. The intermediate portions 41b, 41b extend obliquely downwardly at a mild inclination from rear ends of the front portion inclined portions 41a, 41a and rearwardly of the vehicle body with a substantially constant gap therebetween. The rear portion inclined portion 41c, 41c extend obliquely downwardly at a sharper inclination than the intermediate portions 41b, 41b from rear ends of the intermediate portions 41b, 41b and rearwardly of the vehicle body with a substantially constant gap therebetween. Each of the pair of left and right upper frames 41, 41 can be formed by bending a single steel pipe.

Each of the pair of left and right sub frames 60, 60 is connected to a corresponding boundary between the intermediate portions 41b, 41b and the rear portion inclined portion 41c, 41c of the upper frames 41, 41. Each of the sub frames 60, 60 extends rearwardly substantially horizontally. The sub frame 60 is then bent downwardly at a rearward portion of the vehicle body into a U shape turned sideways in a side view. The sub frames 60, 60 then have leading ends thereof connected to the pair of left and right lower frames 42, 42.

The sub frames 60, 60 include horizontally extending portions 60a, 60a that serve as seat rails. The abovementioned cross member 4m (FIG. 2) that serves as a support member supporting a rear end of the seat 29 is disposed on the horizontally extending portions 60a, 60a.

Referring to FIG. 1, the pair of left and right lower frames 42, 42 includes horizontal portions 42a, 42a and rear portion inclined portions 42b, 42b. Specifically, horizontal portions 42a, 42a extend longitudinally along the vehicle body under the upper frames 41, 41. Connected to the front portion inclined portions 41a, 41a of the upper frames 41, 41, the horizontal portions 42a, 42a extend substantially horizontally rearwardly of the vehicle body. The rear portion inclined portions 42b, 42b extend from rear end portions of the horizontal portions 42a, 42a and have rear ends thereof connected to the sub frames 60, 60. Each of the pair of left and right lower frames 42, 42 can also be formed by bending a single steel pipe.

Each of the pair of left and right sub frames 60, 60 is connected to a boundary between corresponding ones of the horizontal portions 42a, 42a and the rear portion inclined portions 42b, 42b of the lower frames 42, 42 via a bracket 71. A final gear case (not shown) for the rear wheels 3 is supported between the sub frames 60, 60.

A rear sub frame 44 may be disposed between each pair of the sub frame 60 and the rear portion inclined portion 42b of the lower frame 42. The rear sub frame 44 is provided in pairs. Upper suspension arm support portions 64, 64, lower suspension arm support portions 65, 65, and a cushion support portion 66 that support an upper suspension arm 61 (FIG. 2), a lower suspension arm 62 (FIG. 2), and a rear cushion 63 (FIG. 1) constituting the rear suspension 59 are disposed on the rear sub frame 44 and the sub frame 60, so that each component of the rear suspension 59 is supported.

Additionally, referring to the example of FIG. 1, a pair of left and right front pipes 46, 46 is disposed between the upper frames 41 and the lower frames 42 at the front portion of the vehicle body. The front pipe 46 extends from a point near a front end of the upper frame 41 rearwardly of the vehicle body. Upper suspension arm support portions 54, 54, lower suspension arm support portions 55, 55, and cushion support portion 56, 56, that support an upper suspension arm 51 (FIG. 2), a lower suspension arm 52 (FIG. 2), and a front cushion (FIG. 1) constituting the front suspension (suspension system) 50, are disposed on the front pipes 46, 46, the horizontal portions 42a, 42a of the lower frames 42, 42, and the front portion inclined portions 41a, 41a of the upper frames 41, 41, so that each component of the front suspension 50 is supported. In accordance with this embodiment, the cushion support portion 56, 56 are formed on the cross member 4f disposed between the front portion inclined portions 41a, 41a of the upper frames 41, 41.

The front pipe 46 bends at a point rearward of the upper suspension arm support portion 54, specifically, a bent portion 46a, to extend obliquely downwardly before being connected to the horizontal portion 42a of the lower frame 42. A pair of left and right down tubes 47, 47 extending downwardly from the pair of left and right upper frames 41, 41 is connected between the bent portions 46a, 46a of the front pipes 46, 46 and the upper frames 41, 41 (front portion inclined portions 41a, 41a). Further, a pair of left and right front lower tubes 48, 48 extending from the pair of left and right lower frames 42, 42 is connected between the bent portions 46a, 46a and the lower frames 42, 42. The down tubes 47, 47 and the front lower tubes 48, 48 form a truss structure to enhance frame rigidity around the front portion. Note here that the down tube 47 and the upper frame 41 are joined together via a bracket 49 that is a substantially triangular sheet member as shown in FIG. 1. The bracket 49 contributes to an increased joint area, so that connection strength between the down tube 47 and the upper frame 41 can be enhanced.

Figure 3:
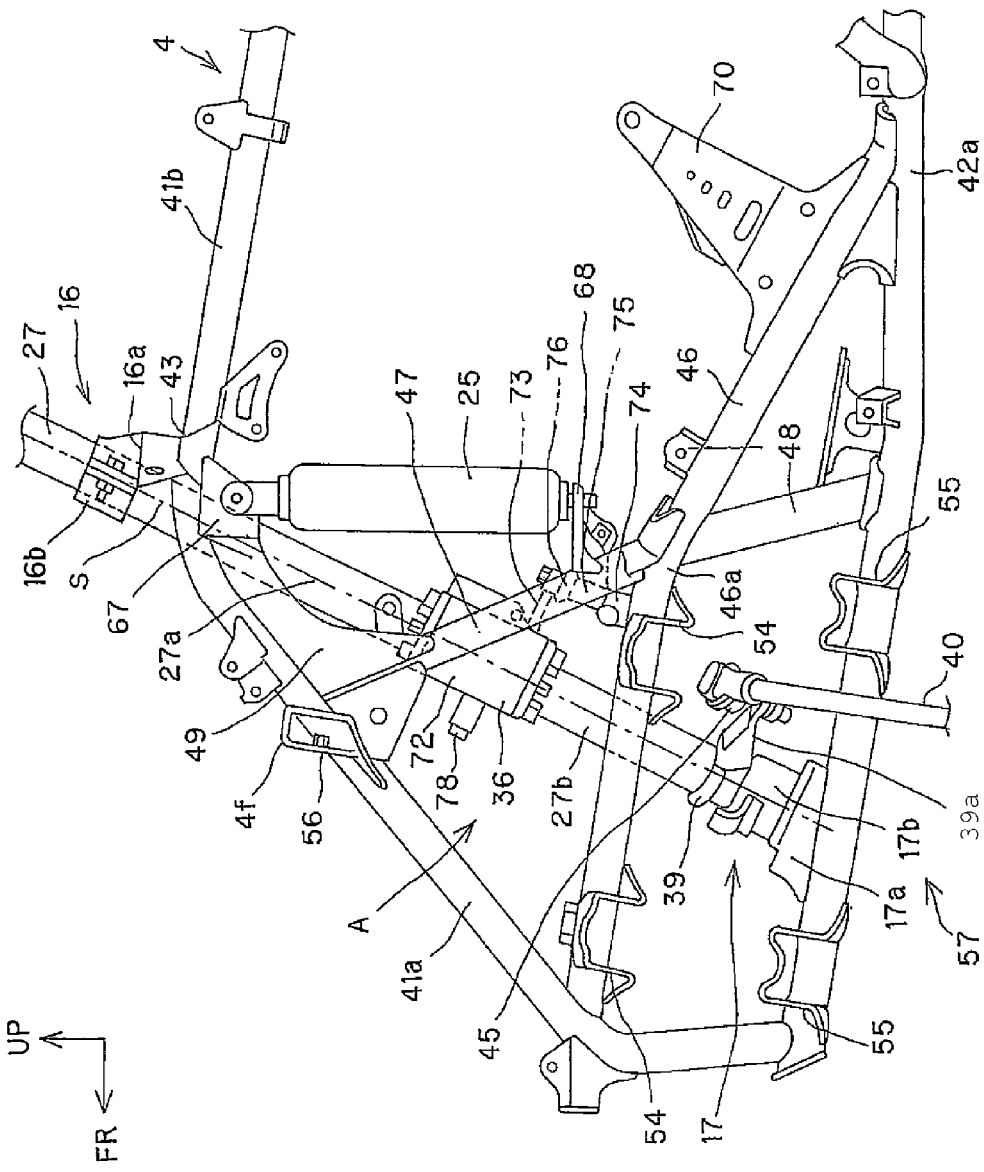
FIG. 3 is a side elevational view showing arrangements of a steering damper.

The saddle riding type vehicle 1 includes a steering damper 36. In some examples, steering damper 36 attenuates a reaction force in a rotation direction acting on the steering shaft 27 when the front wheels 2 oscillate laterally due to, for example, road surface conditions. In accordance with embodiments of the present invention, the steering shaft 27 is divided into an upper steering shaft 27a and a lower steering shaft 27b with the steering damper 36 disposed therebetween, as shown in FIG. 3. Specifically, the upper steering shaft 27a and the lower steering shaft 27b are disposed on a same axis S and connected together by the steering damper 36. This causes the upper steering shaft 27a and the lower steering shaft 27b to rotate integrally with each other.

The upper steering shaft 27a is supported by the shaft upper support portion 16 disposed on the upper portion of the vehicle body frame 4. Specifically, an upper cross pipe 43 connecting between the upper frames 41, 41 is disposed at the boundary between the front portion inclined portions 41a, 41a and the intermediate portions 41b, 41b of the upper frames 41, 41. The shaft upper support portion 16 is disposed on the upper cross pipe 43.

The shaft upper support portion 16 includes a rear half body 16a and a front half body 16b. Specifically, the rear half body 16a is fixed to the upper cross pipe 43. The front half body 16b is bolted to the rear half body 16a. An outer peripheral surface of the upper steering shaft 27a is rotatably retained on a cylindrical inner peripheral surface formed by the rear and front half bodies 16a, 16b via, for example, a bushing (not shown).

Figure 4:
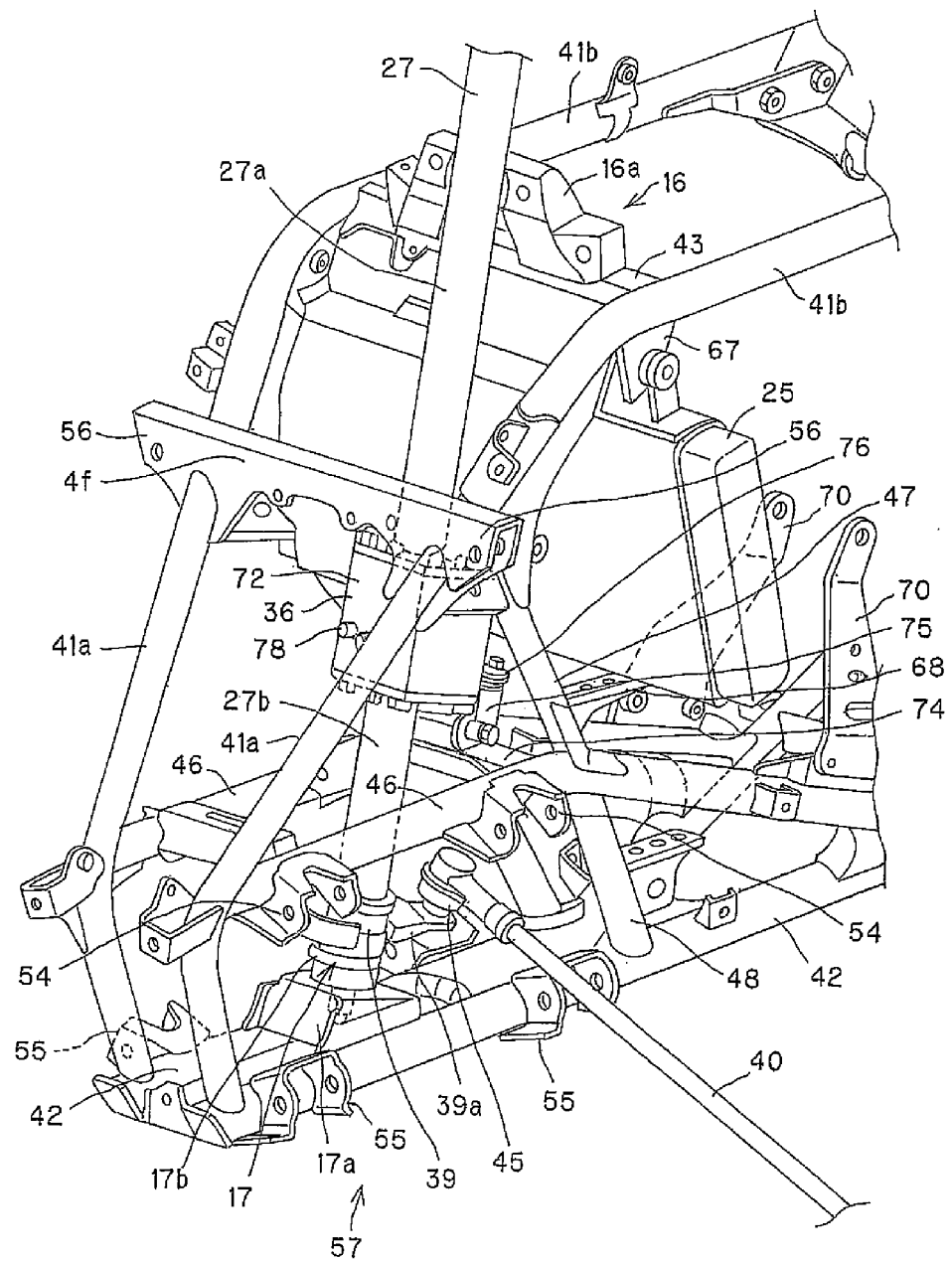
FIG. 4 is a perspective view showing the steering damper of FIG. 3, as viewed from an obliquely left forward direction of a vehicle body.

The lower steering shaft 27b, on the other hand, is supported by the shaft lower support portion 17 disposed at the lower portion of the vehicle body frame 4. Specifically, referring to FIGS. 3 and 4, the shaft lower support portion 17 integrates a lower support plate 17a and a shaft holder 17b. In one example, the lower support plate 17a, which is of a trapezoidal shape from a side view, is disposed across the pair of left and right lower frames 42, 42. The tubular shaft holder 17b protrudes upwardly along the axis S (FIG. 3) of the steering shaft 27 from an upper surface portion of the lower support plate 17a. An outer race of a ball bearing (not shown) is fixedly retained on an inner periphery of the shaft holder 17b, so that the lower steering shaft 27b is rotatably supported on the shaft holder 17b via the ball bearing.

According to one embodiment, a pitman arm 39 is integrally attached on an outer periphery of a lower portion of the lower steering shaft 27b at a position upward of the shaft lower support portion 17. The pitman arm 39 includes an arm portion 39a extending rearwardly of the vehicle body. A left and right tie rod 40 extending toward a knuckle (not shown) of the left and right front wheels 2 has a first end portion connected via a ball joint 45 to a leading end side of the arm portion 39a. As a result, rotation of the handlebar 30, the steering shaft 27, and other parts, causes the left and right front wheels 2 to be steered in the same direction via, for example, the left and right tie rod 40. Specifically, a steering mechanism (front wheel steering system) 57 of the saddle riding type vehicle 1 can include the handlebar 30, the steering shaft 27, the pitman arm 39, the left and right tie rod 40, and the knuckle.

Example arrangements of the steering damper 36 will be described below.

Referring to the example of FIG. 3, the steering damper 36 includes a damper case 72 and an arm 73. Specifically, the damper case 72 connects between the upper steering shaft 27a and the lower steering shaft 27b. The arm 73 is directly connected to a vane (to be described later) that rotates within the damper case 72. The arm 73 protrudes outwardly of the damper case 72.

In an embodiment, the upper steering shaft 27a and the lower steering shaft 27b are connected to the damper case 72 through bolting, welding, or other means so as to make these parts coaxial with each other. Connecting the components in this manner allows the damper case 72 to function as part of the steering shaft 27. This eliminates the need for a part that fixes the damper case 72 to the vehicle body frame 4, such as a dedicated bracket. Vehicle body structure can therefore be simplified and reduction in weight of the vehicle body frame can also be achieved. In addition, the steering damper 36 can in some cases be relatively heavy; thus, being disposed between the upper steering shaft 27a and the lower steering shaft 27b, it can be disposed at a low position in the vehicle body. Steerability of the steering mechanism 57 can thus be stabilized.

Additionally, the damper case 72 is disposed forwardly of the radiator 25. The radiator 25 is supported by a bracket 67 disposed at the boundary between the front portion inclined portions 41a, 41a and the intermediate portions 41b, 41b of the upper frames 41, 41 and a bracket 68 that extends rearwardly of the vehicle body from lower portions of the pair of left and right down tubes 47, 47.

To ensure a good air flow to the radiator 25, there is a sufficiently large space available forwardly of the radiator 25. Further, in some embodiments, the damper case 72 is disposed on the axis S of the steering shaft 27. As compared with an arrangement in which the steering damper is disposed around the steering shaft, therefore, the damper case 72 requires a smaller mounting space. Consequently, the space in the vehicle body frame 4 can be effectively used, so that the degree of freedom in disposing the steering damper 36 can be improved.

Referring to FIG. 3, the damper case 72 can be disposed between the shaft upper support portion 16 and the shaft lower support portion 17. The upper steering shaft 27a and the lower steering shaft 27b connected to the damper case 72 are supported by the shaft upper support portion 16 and the shaft lower support portion 17, respectively. Disposing the damper case 72 between the shaft upper support portion 16 and the shaft lower support portion 17 allows compression stress, tensile stress, and bending stress applied to the damper case 72 via the steering shaft 27 to be reduced. The damper case can therefore be formed with a reduced load resistance, so that further reduction in weight and size of the damper case 72 can be achieved.

Referring to FIG. 3, the damper case 72 is disposed in a space A surrounded by the front portion inclined portion 41a of the upper frame 41, the front pipe 46, and the down tube 47. The upper frame 41, the front pipe 46, and the down tube 47 therefore provide a rotatable range for the damper case 72. Additionally, in one embodiment of the present invention, the damper case 72 is disposed so as to overlap in a side view with the down tube 47, so that sides of the damper case 72 are protected. Further, the vehicle body cover 32 can be disposed outside the upper frame 41, the front pipe 46, the down tube 47, and the like. As a result, the steering shaft 27 and the steering damper 36 can be protected from, for example, flying gravel.

Figure 5:
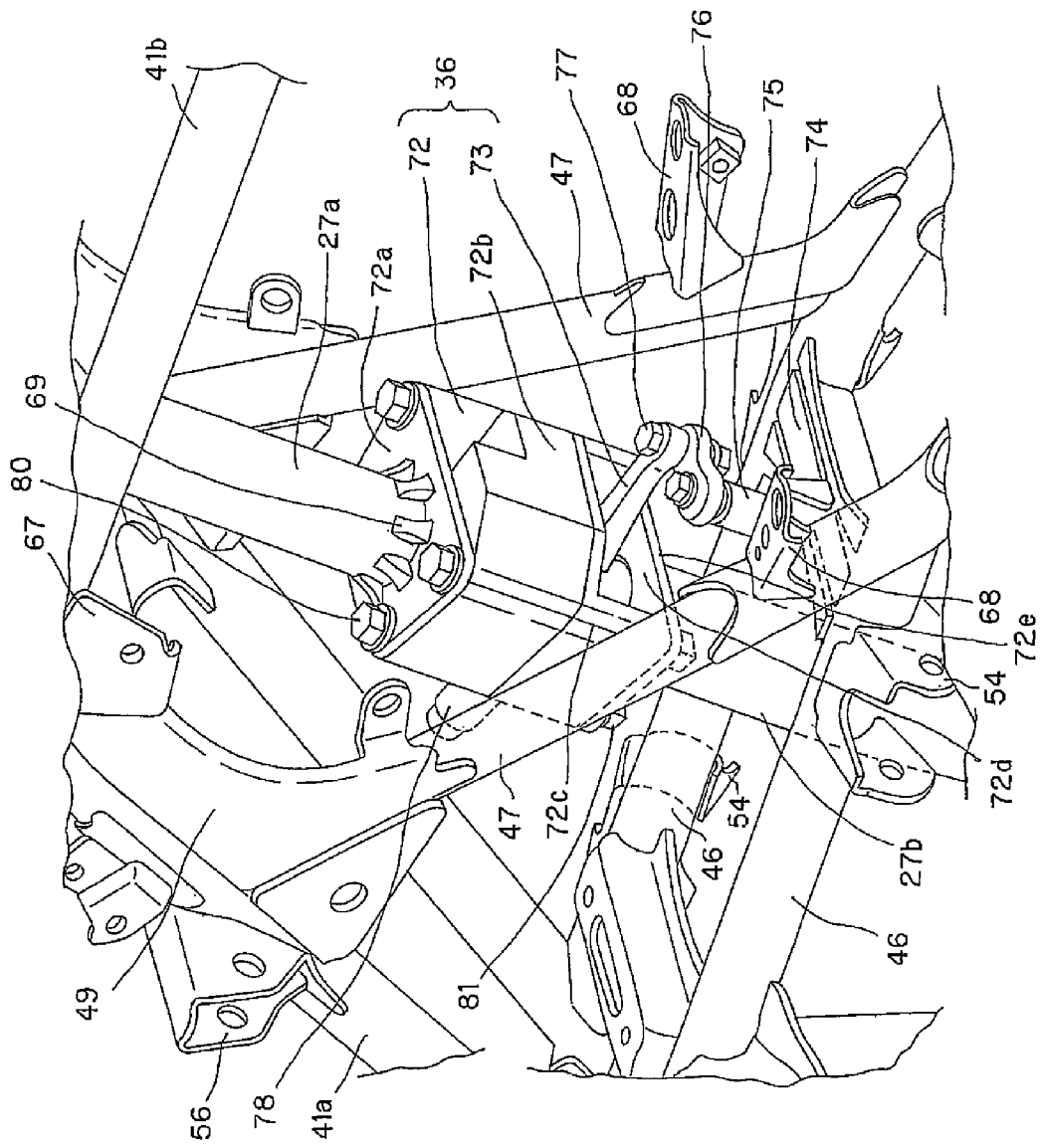
FIG. 5 is a perspective view showing the steering damper as viewed from an obliquely left rearward direction of the vehicle body.

Referring to the example of FIG. 5, the damper case 72 includes an upper lid portion 72a, an upper case 72b stacked on a lower case 72c, and a lower lid portion 72e. The upper lid portion 72a and the lower lid portion 72e may be fixedly attached to shaft end portions of the upper steering shaft 27a and the lower steering shaft 27b via weld portions 69, respectively.

Additionally, in one example, the upper case 72b and the lower case 72c are disposed between the upper lid portion 72a and the lower lid portion 72e. The damper case 72 can be integrally connected with bolts 80 that penetrate through the upper lid portion 72a, the upper case 72b, the lower case 72c, and the lower lid portion 72e and nuts 81. This results in the upper steering shaft 27a and the lower steering shaft 27b being connected by the damper case 72, so that the damper case 72 rotates integrally with the steering shaft 27.

In an embodiment the upper case 72b rotatably houses the vane therein. The arm 73 connected to the vane extends rearwardly of the vehicle body from the damper case 72 through an opening portion 72d formed in the surface of the lower case 72c facing rearwardly of the vehicle body. A cross member 74 connecting between the front pipes 46, 46 at a point near the bent portion 46a is disposed on the front pipe 46. The cross member includes a shaft portion 75 provided thereon in a standing condition. The shaft portion 75 and a leading end of the arm 73 can be fixed together by a bolt 77 via a link member (buffer mechanism) 76 in which, for example, a rubber bushing or a pillow ball is placed. Connecting the arm 73 and the shaft portion 75 indirectly, via the link member 76, allows displacement to be absorbed by the link member 76. Displacement can occur in the steering shaft 27 during, for example, running. In addition, vibration transmitted from the vehicle body frame 4 to the steering damper 36 can also be reduced. Smooth operation of the vane inside the damper case 72 can therefore be maintained. Performance of the steering damper 36 can thus be stabilized. Note that the shaft portion 75 and the leading end of the arm 73 may also be connected using an elastic member (buffer mechanism), such as a hard rubber.

Connecting the arm 73 to the cross member 74 (vehicle body frame 4) in the foregoing manner causes the damper directly connected to the arm 73 to rotate relatively in the damper case 72 when the damper case 72 is rotated via the steering shaft 27.

Figure 6:
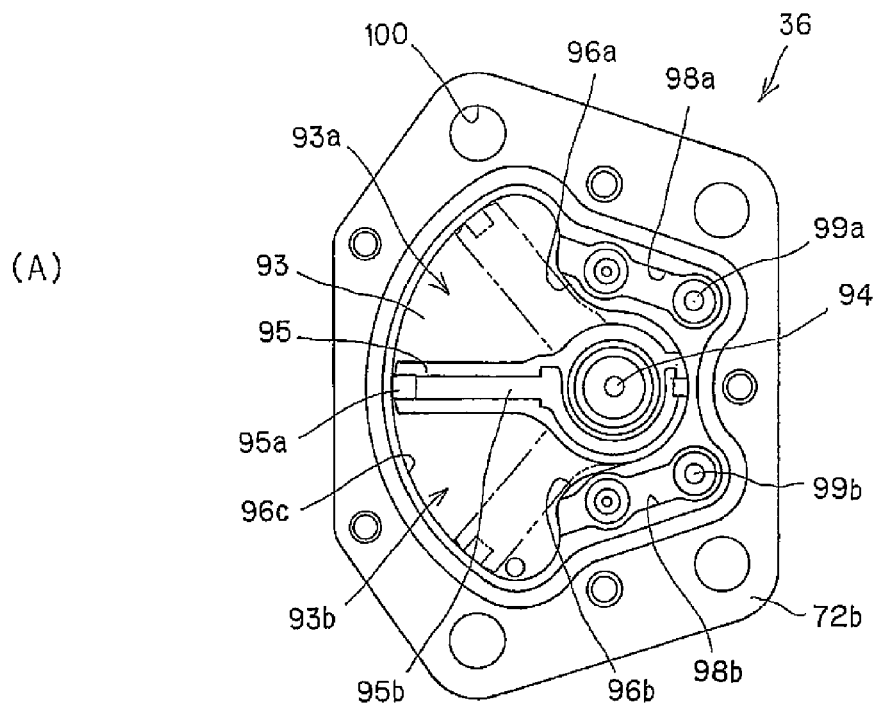
FIG. 6A is a plan view showing an upper case of a damper case.
FIG. 6B is a plan view showing a lower case.
Figure 6:
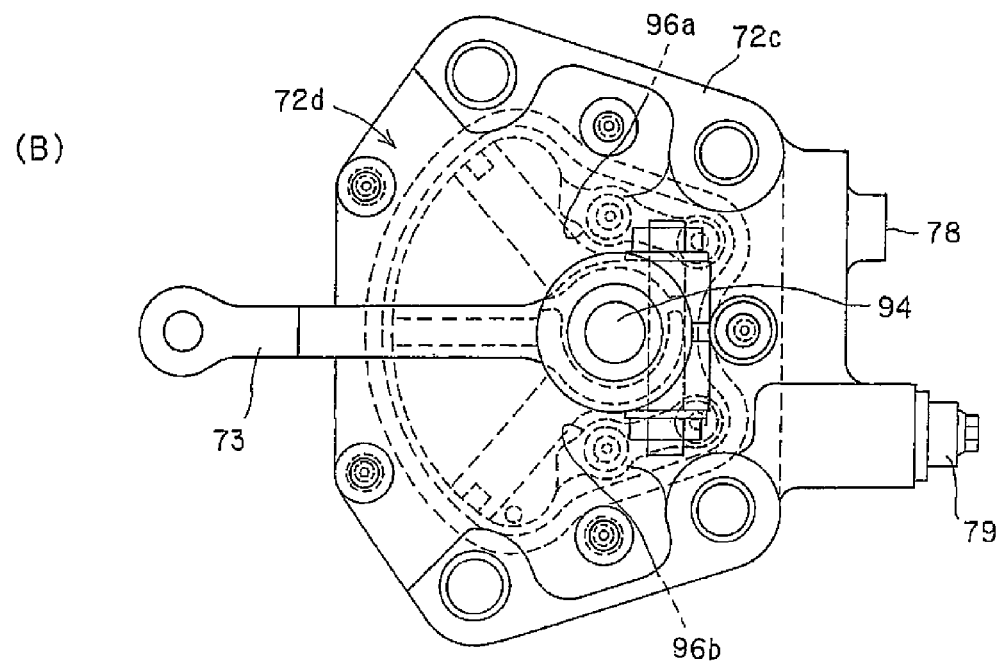

Referring to the example of FIG. 6A, the upper case 72b includes a hydraulic chamber 93 formed therein. In one embodiment, the hydraulic chamber 93 has substantially a sector shape in a top plan view and houses therein a vane 95 rotatable about a rotation shaft 94. The rotation shaft 94 has a first end journaled by a back surface of the upper lid portion 72a and a second end penetrating through and journaled by a bottom portion of the upper case 72b. In this embodiment, the rotation shaft 94 is disposed coaxially with the axis S of the steering shaft 27. In FIG. 6A, reference numeral 100 denotes a hole portion through which the bolt 80 (FIG. 5) connecting the upper lid portion 72a, the upper case 72b, the lower case 72c, and the lower lid portion 72e penetrates.

In addition, referring to the example of FIG. 6B, the arm 73 is connected to a leading end of the rotation shaft 94 so as to overlap the vane 95. This results in the arm 73 being operatively connected with the vane 95 via the rotation shaft 94. Further, the arm 73 extends to the outside through the opening portion 72d formed to face rearwardly of the vehicle body in the lower case 72c.

In an embodiment, the hydraulic chamber 93 is formed to include right and left side walls 96a, 96b and a peripheral side wall 96c. As the damper case 72 (upper case 72b) rotates, the vane 95 rotates relatively from the right side wall 96a to the left side wall 96b. A sealing member 95a is disposed between a leading end portion of the vane 95 and the peripheral side wall 96c. A sealing member 95b can be disposed in each space at an upper surface portion and a lower surface portion of the vane 95 relative to the upper lid portion 72a and the bottom portion, respectively. The foregoing embodiments define two hydraulic chamber space portions 93a, 93b partitioned by the vane 95 in the hydraulic chamber 93 and the volume of each space portion depends on the position of rotation of the vane 95.

According to certain embodiments, the hydraulic chamber space portions 93a, 93b include oil paths 98a, 98b having fluid communication therewith, disposed on sides of the rotation shaft 94. The oil paths 98a, 98b include communication ports 99a, 99b that provide fluid communication with each other via a bypass conduit (not shown). In addition, the hydraulic chamber space portions 93a, 93b are packed with a hydraulic fluid, specifically, a hydraulic oil with high viscosity. As the vane 95 rotates between the right side wall 96a and the left side wall 96b, the hydraulic fluid displaced by the vane 95 flows from one space portion to another through the bypass conduit.

A flow volume of the bypass conduit can be freely adjusted using a choke screw. The choke screw has a leading end portion extending into the bypass conduit. The position of the leading end portion determines the flow volume. Accordingly, adjusting the position of the choke screw allows resistance strength of the hydraulic fluid relative to the rotation of the vane 95 and an attenuation effect to be controlled. The choke screw is connected to an easy to operate adjustment knob 79 formed on the surface of the lower case 72c on the forward side of the vehicle body, allowing the rider to adjust the attenuation effect of the saddle riding type vehicle 1.

Additionally, in some embodiments, a supply port 78 is formed beside the adjustment knob 79 on the surface of the lower case 72c on the forward side of the vehicle body. The supply port 78 communicates with the hydraulic chamber 93 and supplies the hydraulic chamber 93 with the hydraulic oil. The supply port 78 is fitted with a cap. With the cap removed, oil can be easily supplied from the front of the vehicle body.

The adjustment knob 79 and the supply port 78, which are disposed on the surface of the lower case 72c on the forward side of the vehicle body, permit easy access thereto from the forward side of the vehicle body.

As described heretofore, in accordance with an embodiment of the present invention, the saddle riding type vehicle 1 includes the vehicle body frame 4 constituting the vehicle 1, the front wheels 2, 2 disposed steerably on the vehicle body frame 4, the steering shaft 27 transmitting a steering input from the rider to the front wheels 2, 2, and the steering damper 36 giving the steering mechanism 57 an attenuation force relative to the rotation of the steering shaft 27. The steering damper 36 includes the damper case 72, the vane rotatable in the damper case 72, and the arm 73 directly connected to the vane 95 and extending to the outside of the damper case 72. The damper case 72 is disposed between the upper steering shaft 27a and the lower steering shaft 27b to form part of the steering shaft 27 and the arm 73 is directly connected to the vehicle body frame 4. This eliminates the need for a part that fixes the damper case 72 to the vehicle body frame 4, such as a dedicated bracket. Vehicle body structure can therefore be simplified and reduction in weight of the vehicle body frame can also be achieved. In addition, the relatively heavy steering damper 36, being disposed between the upper steering shaft 27a and the lower steering shaft 27b, can be disposed at a low position in the vehicle body. Steerability of the steering mechanism 57 can thus be stabilized.

Additionally, in accordance with an embodiment of the present invention, the saddle riding type vehicle 1 further includes the shaft upper support portion 16 and the shaft lower support portion 17 disposed at an upper portion and a lower portion, respectively, of the vehicle body frame 4. The shaft upper support portion 16 and the shaft lower support portion 17 support rotation of the steering shaft 27. Further, the damper case 72 may be disposed between the shaft upper support portion 16 and the shaft lower support portion 17. As a result, compression stress, tensile stress, and bending stress applied to the damper case 72 via the steering shaft 27 can be reduced. The damper case 72 can therefore be formed to have a reduced load resistance, so that further reduction in weight and size of the damper case 72 can be achieved.

Additionally, in accordance with an embodiment of the present invention, the arm 73 is connected to the vehicle body frame 4 via the link member 76. Displacement that would occur in the steering shaft 27 while the vehicle is running, for example, can be absorbed by the link member 76. In addition, vibration transmitted from the vehicle body frame 4 to the steering damper 36 can also be reduced. Smooth operation of the vane 95 inside the damper case 72 can therefore be maintained. Accordingly, performance of the steering damper 36 can be stabilized.

Additionally, in accordance with an embodiment of the present invention, the damper case 72 is disposed in the space A surrounded by the front portion inclined portion 41a of the upper frame 41, the front pipe 46, and the down tube 47. The upper frame 41, the front pipe 46, and the down tube 47 therefore provide a rotatable range for the damper case 72. Additionally, the damper case 72 is disposed so as to overlap in a side view with the down tube 47, so that sides of the damper case 72 are protected. Further, the vehicle body cover 32 is disposed outside the upper frame 41, the front pipe 46, the down tube 47, and the like, so that the steering shaft 27 and the steering damper 36 can be protected from, for example, flying gravel.

Additionally, in accordance with an embodiment of the present invention, the arm 73 of the steering damper 36 is connected to the cross member 74 connecting between the front pipes 46, 46, for which rigidity strength is ensured. The arm 73 can therefore stably receive a reaction force of the attenuation force generated by the steering damper 36, so that attenuation performance of the steering damper 36 can further be stabilized.

Additionally, in accordance with an embodiment of the present invention, the arm 73 extends rearwardly of the vehicle body from the damper case 72, which provides a reliable protection for the arm 73 against a forward impact applied thereto.

The foregoing description of exemplary embodiments of the present invention has been presented for the purposes of illustration and description and it will be understood by those skilled in the art that the present invention is not limited to the above described embodiment. For example, in the above described embodiment, the arm 73 of the steering damper 36 is connected to the cross member 74 connecting between the front pipes 46, 46. This is not the only possible arrangement; rather, the arm 73 of the steering damper 36 may be connected to the upper cross pipe 43 connecting between the upper frames 41, 41. In addition, embodiments of the present invention have been described in which the present invention is applied to the four wheeled saddle riding type vehicle. Nonetheless, the present invention may be applied to various other types of vehicles including a two wheeled vehicle.

DESCRIPTION OF REFERENCE NUMERALS

1: Saddle riding type vehicle
2: Front wheel
4: Vehicle body frame
16: Shaft upper support portion (rotation support member)
17: Shaft lower support portion (rotation support member)
27: Steering shaft
27a: Upper steering shaft
27b: Lower steering shaft
36: Steering damper
41: Upper frame
41a: Front portion inclined portion
41b: Intermediate portion
41c: Rear portion inclined portion
42: Lower frame
42a: Horizontal portion
42b: Rear portion inclined portion
43: Upper cross pipe
44: Rear sub frame
46: Front pipe
47: Down tube
48: Front lower tube
57: Steering mechanism (front wheel steering system)
72: Damper case
72a: Upper lid portion
72b: Upper case
72c: Lower case
72d: Opening portion
72e: Lower lid portion
73: Arm
74: Cross member
75: Shaft portion
A: Space
S: Axis

We claim:
1. A steering damper device for a saddle riding type vehicle, the steering damper device comprising:
a damper case;
a vane rotatable in the damper case; and
an arm directly connected to the vane and extending to an outside of the damper case, wherein
the steering damper device is configured to provide a front wheel steering system of the vehicle with an attenuation force relative to rotation of a steering shaft,
the steering shaft is configured to transmit a steering input from a rider to a front wheel disposed steerably on a vehicle body frame constituting the vehicle,
the damper case is disposed midway in the steering shaft to form part thereof, and
the arm is indirectly connected to the vehicle body frame.
2. The steering damper device according to claim 1, wherein the vehicle further comprises
rotation support members disposed at an upper portion and a lower portion of the vehicle body frame, the rotation support members supporting rotation of the steering shaft, wherein:
the damper case is disposed between the upper and lower rotation support members.
3. The steering damper device according to claim 1, wherein:
the arm is connected to the vehicle body frame via a buffer mechanism.
4. The steering damper device according to claim 1, wherein:
the steering damper is disposed within a space surrounded by the vehicle body frame and, in a side view, overlaps at least part of the vehicle body frame.
5. The steering damper device according to claim 4, wherein the vehicle further comprises
an upper cross pipe connecting between a pair of left and right upper frames; and
a cross member connecting between a pair of left and right front pipes, wherein:
the arm of the steering damper is connected to either the upper cross pipe or the cross member.
6. The steering damper device according to claim 1, wherein:
the arm extends rearwardly of a vehicle body from the damper case.
7. A steering damper device for a saddle riding type vehicle, the steering damper device comprising:
steering damper means for giving a front wheel steering system an attenuation force relative to rotation of a steering shaft means, the steering shaft means for transmitting a steering input from a rider to a front wheel means for steering the vehicle,
wherein the steering shaft means disposed steerably on a vehicle body frame means for supporting vehicle components thereupon,
the steering damper means comprising
damper case means for containing the steering damper means;
vane means for rotating within the damper case means; and
arm means, directly connected to the vane means, for extending to an outside of the damper case means, wherein
the damper case means is disposed midway in the steering shaft means to form part thereof; and the arm means is indirectly connected to the vehicle body frame means.

8. The steering damper device according to claim 7, wherein the vehicle further comprises
rotation support member means, disposed at an upper portion and a lower portion of the vehicle body frame means, for supporting rotation of the steering shaft means, wherein
the damper case means is disposed between the upper and lower rotation support member means.

9. The steering damper device according to claim 7, wherein:
the arm means is connected to the vehicle body frame via a buffer means.

10. The steering damper device according to claim 7, wherein:
the steering damper means is disposed within a space surrounded by the vehicle body frame means and, in a side view, overlaps at least part of the vehicle body frame.

11. The steering damper device according to claim 10, wherein the vehicle further comprises
upper cross pipe means for connecting between a pair of left and right upper frames; and
cross member means for connecting between a pair of left and right front pipes, wherein
the arm means of the steering damper is connected to either the upper cross pipe means or the cross member means.

12. The steering damper device according to claim 7, wherein:
the arm means extends rearwardly of a vehicle body from the damper case means.

\* \* \* \* \*